(12) United States Patent
Wang et al.

(10) Patent No.: US 12,141,572 B2
(45) Date of Patent: Nov. 12, 2024

(54) METHOD, DEVICE, AND COMPUTER PROGRAM PRODUCT FOR UPGRADING VIRTUAL SYSTEM

(71) Applicant: DELL PRODUCTS L.P., Round Rock, TX (US)

(72) Inventors: Simin Wang, Beijing (CN); Bing Liu, Tianjin (CN)

(73) Assignee: DELL PRODUCTS L.P., Round Rock, TX (US)

( * ) Notice: Subject to any disclaimer, the term of this patent is extended or adjusted under 35 U.S.C. 154(b) by 49 days.

(21) Appl. No.: 17/875,118

(22) Filed: Jul. 27, 2022

(65) Prior Publication Data

US 2023/0385045 A1    Nov. 30, 2023

(30) Foreign Application Priority Data

May 31, 2022    (CN) .......................... 202210611156.8

(51) Int. Cl.
*G06F 8/65*       (2018.01)
*G06F 9/455*      (2018.01)

(52) U.S. Cl.
CPC ............ *G06F 8/65* (2013.01); *G06F 9/45558* (2013.01); *G06F 2009/4557* (2013.01); *G06F 2009/45595* (2013.01)

(58) Field of Classification Search
CPC ............ G06F 8/60–66; G06F 9/45558; G06F 2009/4557; G06F 2009/45595
USPC .................................................. 717/168–178
See application file for complete search history.

(56) References Cited

U.S. PATENT DOCUMENTS

| 2006/0265713 A1* | 11/2006 | Depro ................... G06Q 50/06 718/104 |
| 2010/0287544 A1* | 11/2010 | Bradfield ............... G06F 21/50 718/1 |
| 2013/0132945 A1* | 5/2013 | Anderson ........... G06F 9/45533 718/1 |

(Continued)

OTHER PUBLICATIONS

Tricomi, Giuseppe, et al., Optimal Selection Techniques for Cloud Service Providers, IEEE Access (vol. 8), 2020, 28 pages, [retrieved on Nov. 8, 2023], Retrieved from the Internet: <URL:http://ieeexplore.ieee.org/>.*

(Continued)

*Primary Examiner* — Geoffrey R St Leger
(74) *Attorney, Agent, or Firm* — WOMBLE BOND DICKINSON (US) LLP

(57) ABSTRACT

Embodiments relate to a method, a device, and a computer program product for upgrading a virtual system. The method includes: monitoring usage of system resources by the virtual system to acquire resource usage data indicating a system resource usage state of the virtual system, the virtual system using cloud services that provide the system resources. The method further includes: in response to acquiring attribute sets of a set of candidate cloud services, determining, based on the resource usage data, whether the virtual system needs to be upgraded; in response to determining that the virtual system needs to be upgraded, determining, based on the attribute sets, that the virtual system can be upgraded; and recommending, in response to determining that the virtual system can be upgraded, a candidate cloud service from the set of candidate cloud services based on the resource usage data and the attribute sets.

20 Claims, 4 Drawing Sheets

(56) References Cited

U.S. PATENT DOCUMENTS

2016/0364227 A1* 12/2016 Sakamoto .................. G06F 8/65
2019/0340033 A1* 11/2019 Ganteaume ............. H04L 43/16
2020/0106856 A1*  4/2020 Megahed .............. H04L 41/145

OTHER PUBLICATIONS

Ramamurthy, Arun, et al., Selection of Cloud Service Providers for Hosting Web Applications in a Multi-cloud Environment, IEEE International Conference on Services Computing (SCC), 2020, 8 pages, [retrieved on Nov. 8, 2023], Retrieved from the Internet: <URL: http://ieeexplore.ieee.org/>.*

* cited by examiner

METHOD, DEVICE, AND COMPUTER PROGRAM PRODUCT FOR UPGRADING VIRTUAL SYSTEM

CROSS-REFERENCE TO RELATED APPLICATION

This patent application claims priority, under 35 U.S.C. § 119, of Chinese Patent Application No. 202210611156.8, filed May 31, 2022, which is incorporated by reference in its entirety.

TECHNICAL FIELD

Embodiments of the present disclosure relate to virtualization technology and, more particularly, to a method, a device, and a computer program product for upgrading a virtual system.

BACKGROUND

Virtual systems across cloud platforms help more and more users to deploy their businesses (e.g., subject-specific businesses) on a plurality of cloud platforms more rationally and in a more protected manner. These virtual systems may use cloud services from one or more cloud providers, and these cloud services provide the virtual systems with various system resources needed to run their businesses. For example, different cloud providers may provide a plurality of virtual machine (VM) series, types, and/or models for use by users to create VM instances that have the computing resources needed to run the virtual systems. The cloud providers also provide a variety of cloud storage services for data storage scenarios of the virtual systems for them to choose from, such as various types and sizes of cloud disks.

SUMMARY OF THE INVENTION

Embodiments of the present disclosure provide a solution for upgrading a virtual system.

In a first aspect of the present disclosure, a method for upgrading a virtual system is provided, including: monitoring usage of system resources by the virtual system to acquire resource usage data indicating a system resource usage state of the virtual system, the virtual system using cloud services that provide the system resources; determining, based on the resource usage data, whether the virtual system needs to be upgraded; in response to acquiring attribute sets of a set of candidate cloud services and determining that the virtual system needs to be upgraded, determining, based on the attribute sets, whether the virtual system can be upgraded; and recommending, in response to determining that the virtual system can be upgraded, a candidate cloud service from the set of candidate cloud services based on the resource usage data and the attribute sets.

In a second aspect of the present disclosure, an electronic device is provided. The electronic device includes a processor and a memory that is coupled to the processor and has instructions stored therein. The instructions, when executed by the processor, cause the device to execute actions including: monitoring usage of system resources by a virtual system to acquire resource usage data indicating a system resource usage state of the virtual system, the virtual system using cloud services that provide the system resources; determining, based on the resource usage data, whether the virtual system needs to be upgraded; in response to acquiring attribute sets of a set of candidate cloud services and determining that the virtual system needs to be upgraded, determining, based on the attribute sets, whether the virtual system can be upgraded; and recommending, in response to determining that the virtual system can be upgraded, a candidate cloud service from the set of candidate cloud services based on the resource usage data and the attribute sets.

In a third aspect of the present disclosure, a computer program product is provided. The computer program product is tangibly stored on a computer-readable medium and includes machine-executable instructions, wherein the machine-executable instructions, when executed, cause a machine to execute the method according to the first aspect of the present disclosure.

It should be noted that the Summary of the Invention part is provided to introduce a selection of concepts in a simplified manner, which will be further described in the Detailed Description below. The Summary of the Invention part is neither intended to identify key features or major features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent, in which.

Throughout the drawings, the same or similar reference numerals represent the same or similar elements.

DETAILED DESCRIPTION

The embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" indicates "at least one additional embodiment." Relevant definitions of other terms will be given in the description below.

As used herein, depending on the context, a value "meeting a threshold" depending on the context may refer to the value being greater than the threshold, greater than or equal to the threshold, equal to the threshold, less than or equal to the threshold, less than the threshold, and the like.

When deploying a virtual system across a plurality of cloud platforms (e.g., a data domain (DD) system of a virtual edition (VE)), users may choose, based on their own business demands and the infrastructure workload, cloud services that provide system resources such as computing power and/or storage space to the virtual system. However, during the operation of the virtual system, a plurality of cloud providers may release new cloud service types or editions (e.g., new virtual machine instance types, new cloud storage specifications, and the like), among which there may be some cloud services that can be used to upgrade the virtual system to optimize its performance. However, simply pushing notifications about all new cloud service instances to the users cannot make the users acquire useful information in a timely and effective manner. It is difficult for the users to identify, from the flood of upgrade information, new cloud instances that will allow the performance of the virtual system to at least not degrade.

To enable the users of the virtual system to take advantage of the new characteristics and advantages of the upgraded cloud services, operation and maintenance engineers of the virtual system need to continuously test the latest cloud services released by the cloud providers to (e.g., periodically) release recommended cloud services to customers. For example, FIG. 1 illustrates example 100 of using a conventional test-based method to recommend a cloud service.

Figure 1:
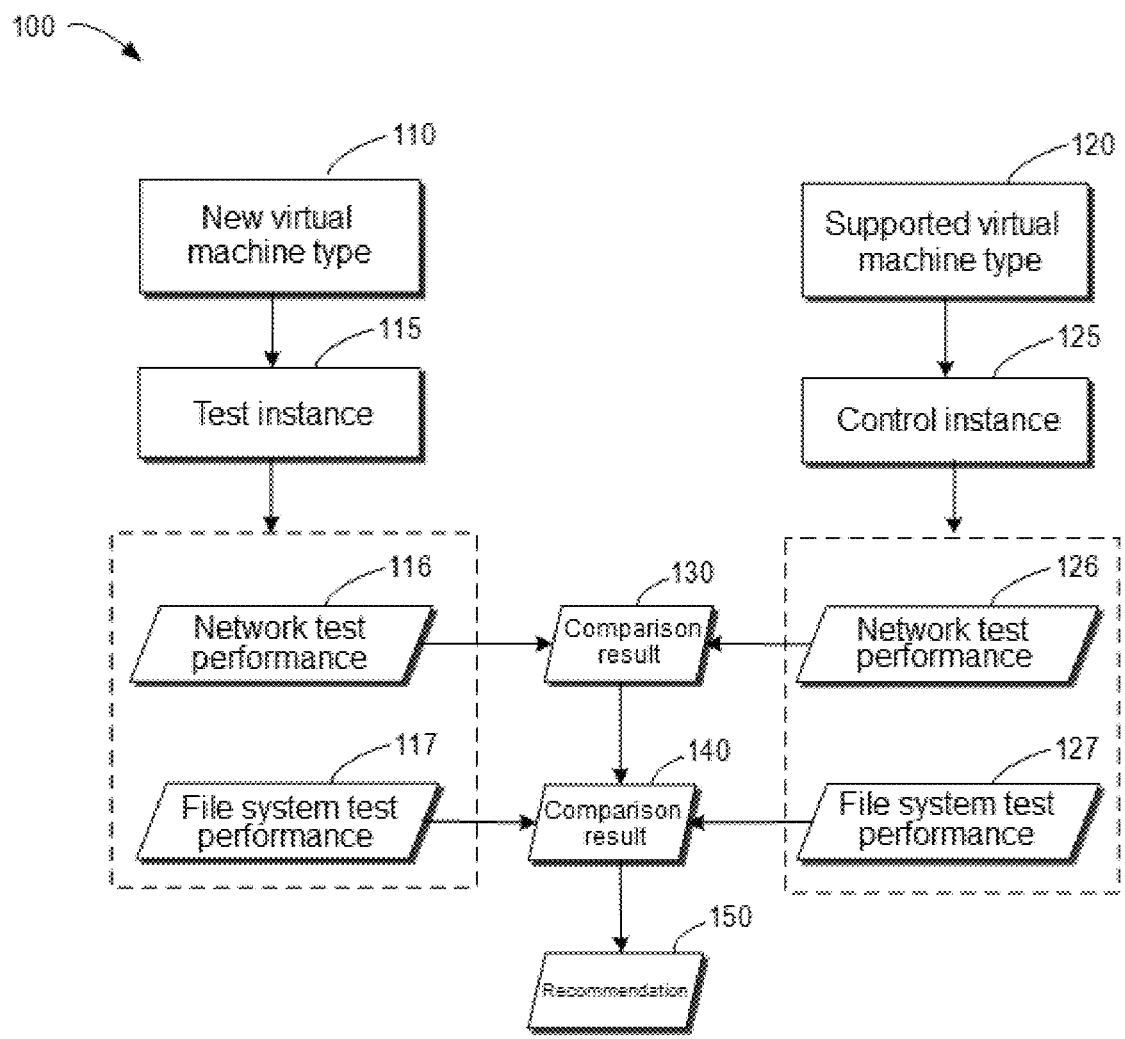
FIG. 1 illustrates example 100 of using a conventional test-based method to recommend a cloud service for upgrading a virtual system.

FIG. 1 illustrates an example in which virtual machine type 110 newly released by a cloud provider is used as a cloud service. In example 100, it is necessary to determine whether new virtual machine type 110 is recommended to the user of a data domain virtual system. To this end, test instance 115 of a data domain virtual system using virtual machine type 110 and control instance 125 of a data domain virtual instance using currently supported virtual machine type 120 are created, respectively. Other configurations (e.g., the storage capacity) of test instance 115 and control instance 125 are the same. Then, operation and maintenance engineers test the network performance and file system performance of the two instances separately to obtain network test performance 116 of test instance 115 and network test performance 126 of control instance 125, as well as file system test performance 117 of test instance 115 and file system test performance 127 of control instance 125. As shown in FIG. 1, the test results of the two instances are compared to each other. Based on the indication by comparison result 130 that the network test performance of test instance 115 is superior to that of control instance 125, and the indication by comparison result 140 that the file system test performance of test instance 115 is superior to that of control instance 125, resulting recommendation 150 will indicate that new virtual machine type 110 is the supported update to the virtual machine type.

However, such conventional recommendation methods are very time consuming and not cost effective. In addition, the conventional recommendation methods always tend to recommend cloud services with higher performance and do not focus on true individual needs of particular users when using the virtual system.

To at least partially address the above and other potential problems, embodiments of the present disclosure propose a solution for upgrading a virtual system. This solution monitors the usage of system resources by a virtual system (e.g., an instance of a virtual machine) during the actual operation of the system to collect history statistical data on resource usage. On the other hand, this solution monitors updates to cloud services from a plurality of cloud providers and verifies whether the newly released cloud services can provide system resources that meet the hard requirements of that virtual system. When there is a new cloud service that meets the requirements, this solution analyzes the collected statistical data to identify whether there is a performance bottleneck in the resource usage of the virtual system, and when there is a performance bottleneck, recommends, based on the statistical data and attributes of the cloud service that meets the requirements, a cloud service for upgrading the virtual system. This solution can reduce the testing burden on the operation and maintenance engineers while making customized cloud service upgrade recommendations for the resource usage of particular users, such that the users of the virtual system can acquire more precise and simpler and customized upgrade notifications for performance bottlenecks of the system in a timely manner.

Figure 2:
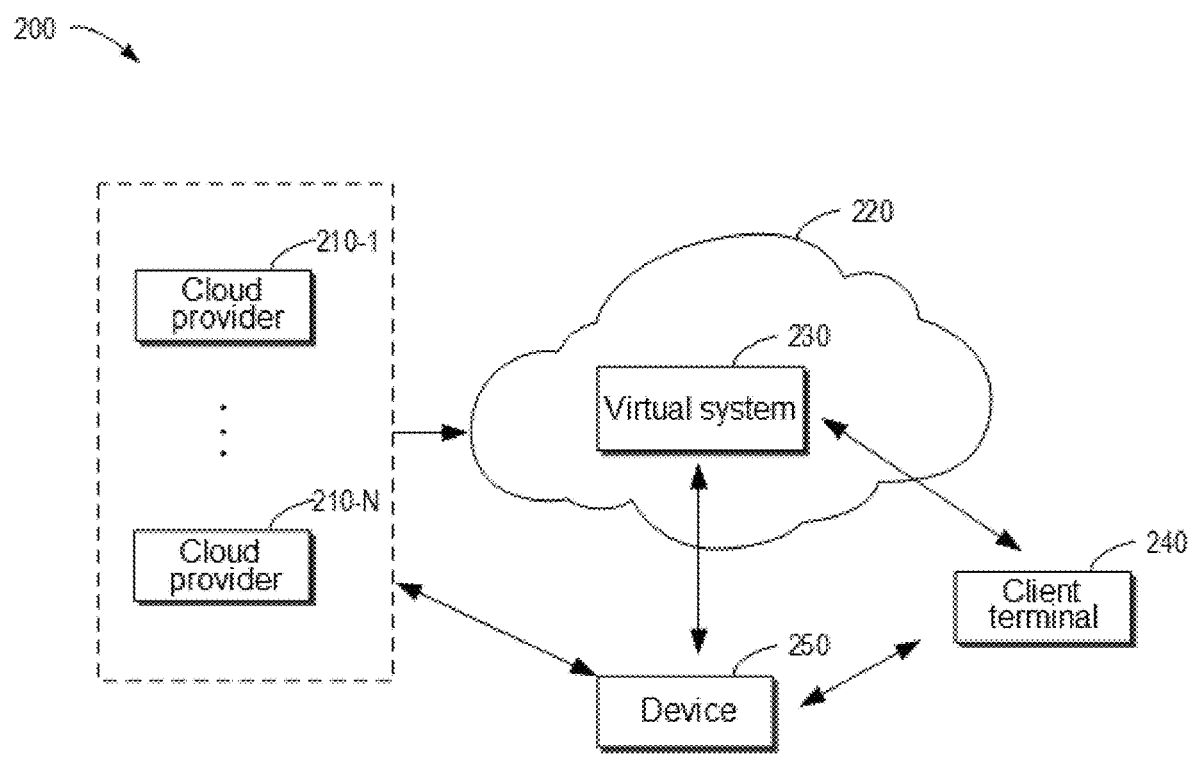
FIG. 2 illustrates a schematic diagram of example environment 200 in which a plurality of embodiments of the present disclosure can be implemented.

FIG. 2 illustrates a schematic diagram of example environment 200 in which a plurality of embodiments of the present disclosure can be implemented. As shown in FIG. 2, environment 200 may include a plurality of cloud providers 210-1 to 210-N(hereinafter referred to collectively or individually as cloud provider 210), where any number of cloud providers 210 not shown may exist in environment 200. The plurality of cloud providers 210 provide system resources of respective types and sizes as cloud services on the respective cloud platform sides, where these platforms and resources are shown generically as cloud 220 in FIG. 2. The plurality of cloud providers 210 update their cloud services periodically or aperiodically and publish various attributes about the updated cloud services.

A user (not shown) may select instances of one or more particular cloud services (e.g., a combination of a virtual machine of a particular edition of and a cloud disk of a particular edition) based on his or her own business demands, and use the resources provided by the selected cloud services to deploy his or her businesses on cloud 220 in the form of, for example, a virtual system or other equivalents. As an example, FIG. 2 illustrates virtual system 230 deployed on cloud 220. The user may interact with virtual system 230 through client terminal 240, thereby using virtual system 230.

FIG. 2 also illustrates device 250. Although, for clarity of illustration, device 250 is shown as a single entity, device 250 may be present and distributed in any suitable form. For example, device 250 may be a control device of an operation and maintenance party different from cloud providers 210, and the operation and maintenance party may deploy and maintain a plurality of virtual systems including virtual system 230 for a plurality of users. As another example, device 250 may be a virtual device and/or part of cloud 220, and the scope of the present disclosure is not limited in this regard. Device 250 may communicate with other entities in environment 200 and perform various operations. For example, device 250 may receive information (e.g., attributes of cloud services) from cloud providers 210, acquire data (e.g., resource usage data) from virtual system 230, generate a recommendation regarding the upgrade of virtual system 230, send a notification to client terminal 240 and receive information sent from client terminal 240, and the like.

The architecture and functions of example environment 200 are described for illustrative purposes only, and do not imply any limitation to the scope of the present disclosure. There may also be other devices, systems, or components that are not shown in example environment 200. In addition, the embodiments of the present disclosure may also be applied to other environments having different structures and/or functions.

Figure 3:
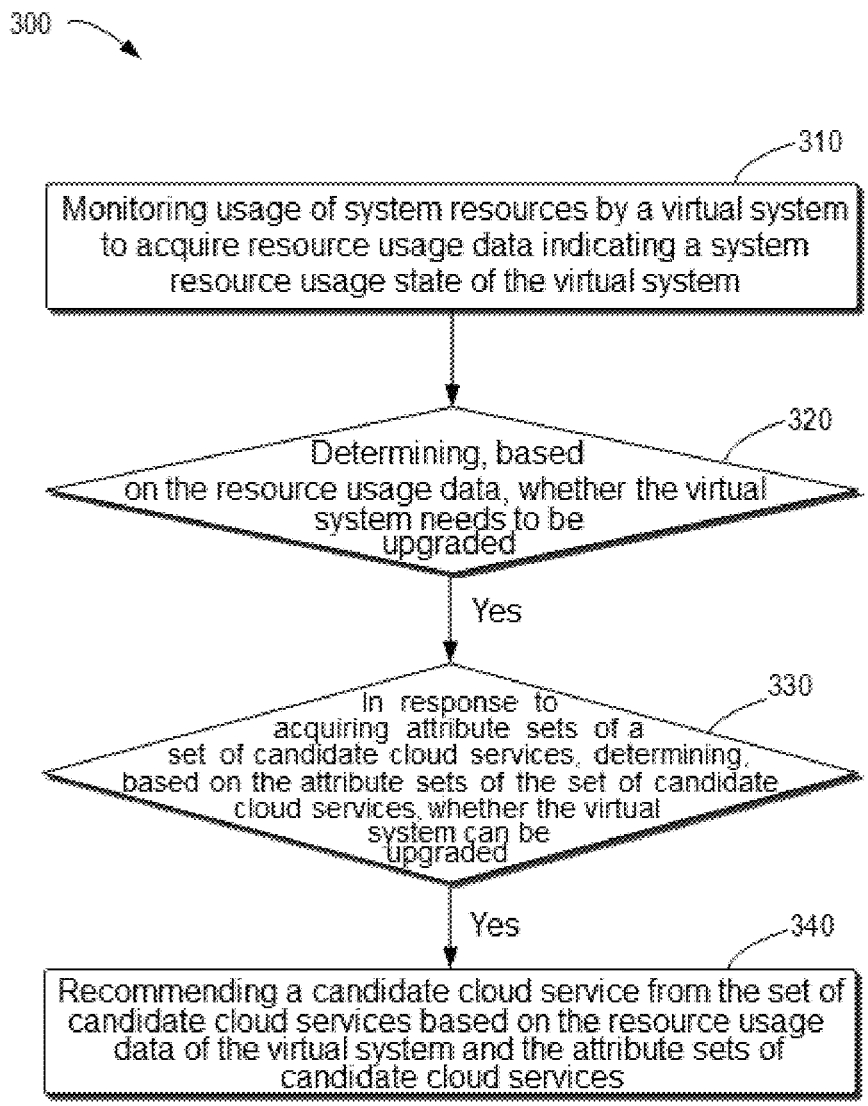
FIG. 3 illustrates method 300 for upgrading a virtual system according to some embodiments of the present disclosure.

FIG. 3 illustrates a flow chart of example method 300 for upgrading a virtual system according to some embodiments of the present disclosure. Example method 300 may be performed, for example, by device 250 as shown in FIG. 2. It should be understood that method 300 may also include additional actions not shown, and the scope of the present disclosure is not limited in this regard. Method 300 is described in detail below in conjunction with example environment 200 of FIG. 2.

At block 310, usage of system resources by a virtual system is monitored to acquire resource usage data indicating a system resource usage state of the virtual system. For example, device 250 may monitor usage of system resources by virtual system 230 to acquire resource usage data indicating the system resource usage state of virtual system 230. As previously described, the system resources used by virtual system 230 may be provided by cloud services from one or more cloud providers 210. The system resource usage data may include, but is not limited to, the CPU usage, the memory usage, the input/output per second (IOPS) (or the number of reads and writes) of the storage apparatus, and the like. Device 250 may monitor the usage of system resources by virtual system 230 by any suitable means, and the scope of the present disclosure is not limited in this regard.

At block 320, it is determined, based on the resource usage data, whether the virtual system needs to be upgraded. For example, device 250 may determine, based on the resource usage data, whether virtual system 230 needs to be upgraded.

In some embodiments, device 250 may determine, based on the resource usage data of virtual system 230, whether one or more resource usage states of virtual system 230 meet a predetermined condition. The one or more resource usage states that meet the predetermined condition reflect that there is a performance bottleneck in virtual system 230 that needs to be improved, and may be used in the subsequent recommendation operation. Only when there is a bottleneck in its performance, does virtual system 230 need to be upgraded, and does device 250 need to make further upgrade recommendations for virtual system 230.

At block 330, in response to acquiring attribute sets of a set of candidate cloud services and determining that the virtual system needs to be upgraded, it is determined, based on the attribute sets of the set of candidate cloud services, whether the virtual system can be upgraded. For example, device 250 may, in response to acquiring attribute sets of a set of candidate cloud services and determining that virtual system 230 needs to be upgraded, determine, based on the attribute sets of the set of candidate cloud services, whether virtual system 230 can be upgraded. Device 250 may determine, based on the attribute sets of the set of candidate cloud services, whether virtual system 230 can be upgraded using one or more candidate cloud services in the set of candidate cloud services.

The attribute set of a cloud service may include, for example, at least an indication of the performance of the system resources provided by that cloud service, such as the computing power and storage capacity. In a non-limiting example, the cloud service may be a specific virtual machine type newly released by cloud provider 210, and the attribute set may include, for example, the number of virtual CPUs (vCPU), the size of memory, the temporary storage capacity, the maximum throughput/bandwidth, the available region of the disk IOPS, the price, etc., of that virtual machine type. In another example, the cloud service may be cloud storage provided by cloud provider 210, and the attribute set may include, for example, the cloud disk type (e.g., SSD), the maximum capacity, the maximum throughput, the maximum IOPS, and the like.

At block 340, in response to determining that the virtual system can be upgraded, a candidate cloud service from the set of candidate cloud services is recommended based on the resource usage data of the virtual system and the attribute sets of candidate cloud services. For example, device 250 may recommend, in response to determining that virtual system 230 can be upgraded, a candidate cloud service from the set of candidate cloud services based on the resource usage data of virtual system 230 and the attribute sets of candidate cloud services.

In some embodiments, device 250 may also generate a recommendation report for upgrading virtual system 230, and the recommendation report may include an indication of the recommended candidate cloud service as described above, such as the name and edition number of the recommended candidate cloud service. The generated recommendation report may be used for prompting a customized upgrade recommendation to the user of virtual system 230 in a timely manner, for subsequently guiding the upgrade of the virtual system, and the like.

Figure 4:
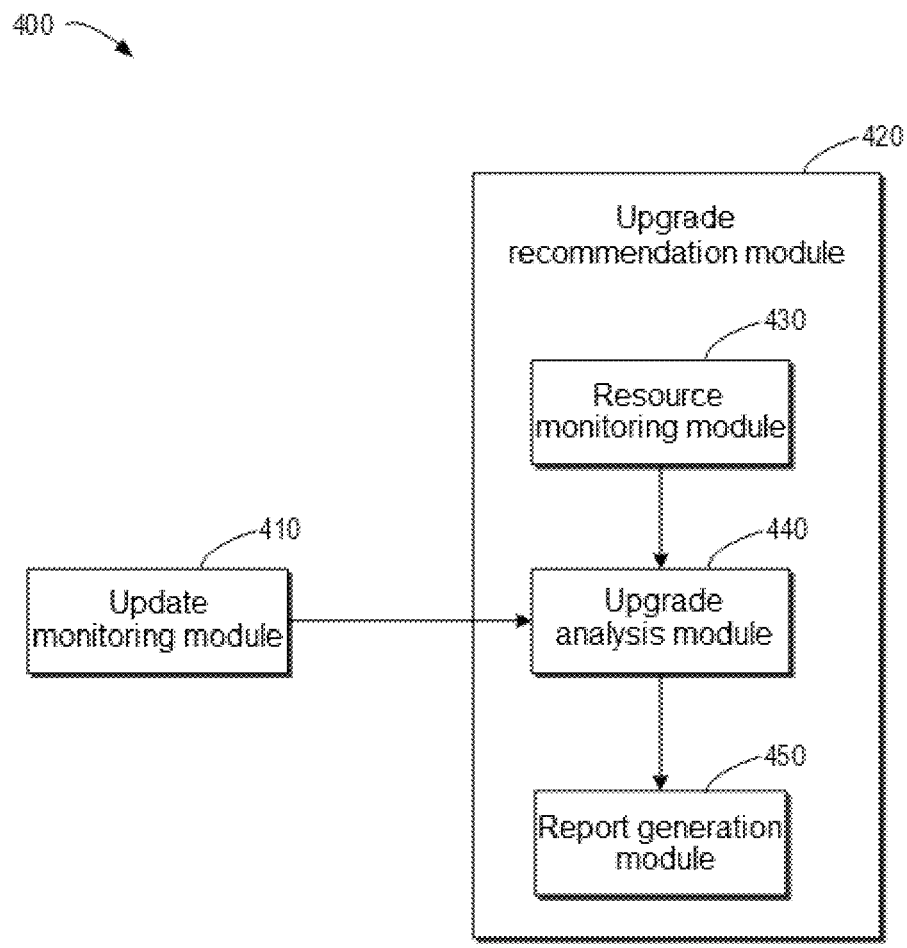
FIG. 4 illustrates example architecture 400 for upgrading a virtual system according to some embodiments of the present disclosure.

FIG. 4 illustrates example architecture 400 for upgrading a virtual system according to some embodiments of the present disclosure. Architecture 400 may be an example implementation of logical modules in device 250 that are used for upgrading a virtual system (e.g., virtual system 230) using the method (e.g., method 300) as described in the present disclosure. FIG. 4 is described below with reference to example environment 200 of FIG. 2. It should be understood that there may be other modules in device 250 that are not shown. In addition, architecture 400 is illustrated as an example only, and other suitable architectures capable of performing the solution described in the present disclosure may also be used.

Architecture 400 may include update monitoring module 410. Device 250 may use update monitoring module 410 to acquire attribute sets of newly released available cloud services from a plurality of cloud providers 210 and select therefrom attribute sets of a set of candidate cloud services. For example, update monitoring module 410 may (e.g., periodically) actively acquire the attribute sets of the available cloud services from cloud providers 210 (e.g., by extracting the most recently published cloud service update information from pages of cloud providers 210), or receive the attribute sets of the available cloud services sent (e.g., via emails) by cloud providers 210 (e.g., by subscribing to cloud service update notifications of the cloud providers). In an example where virtual system 230 is a DD VE system, virtual system 230 may use examples of virtual machines of specific types and cloud storage of specific types provided by cloud providers 210, and examples of cloud providers 210 may include cloud products from various cloud vendors and the like. During operation of this DD VE system, update monitoring module 410 acquires attribute sets of the newly released available virtual machine types and/or cloud storage types from the plurality of cloud providers 210, for example, in a manner as described above.

In some embodiments, update monitoring module 410 may use the acquired set of available cloud services as candidate cloud services. In some embodiments, in response to acquiring attribute sets of a set of available cloud services, update monitoring module 410 may further determine, from the set of available cloud services, one or more available cloud services providing system resources that meet a predetermined performance requirement as a set of candidate cloud services, thereby selecting attribute sets of the set of candidate cloud services from the attribute sets of the available cloud services. For example, update monitoring module 410 may select cloud services of which the attributes meet the predetermined condition as candidate cloud services based on a service level agreement (SLA) associated with virtual system 230, for example, whether the performance of CPU and the size of memory meet minimum requirements according to the SLA, whether the price is not higher than a specified budget, and the like.

Architecture 400 may also include upgrade recommendation module 420, and upgrade recommendation module 420 may include a plurality of sub-modules such as resource monitoring module 430, upgrade analysis module 440, and report generation module 450.

Device 250 may utilize resource monitoring module 430 to monitor the usage of system resources by virtual system 230 to acquire statistical data indicating the system resource usage state of the virtual system. For example, resource monitoring module 430 periodically records a resource usage log of virtual system 230. As another example, resource monitoring module 430 may detect or record the occurrence and duration of a specific resource usage event, such as an event where the CPU usage exceeds a predetermined threshold, through, for example, a listener.

Device 250 may utilize upgrade analysis module 440 to analyze upgrade demands based on the statistical data, so as to determine whether virtual system 230 needs to be upgraded. For example, upgrade analysis module 440 may determine, based on the resource usage data of virtual system 230, whether one or more resource usage states of virtual system 230 meet a predetermined condition. Then, in response to determining that the one or more resource usage states of virtual system 230 meet the predetermined condition, upgrade analysis module 440 may determine that virtual system 230 needs to be upgraded.

The predetermined condition may vary depending on specific virtual system 230 and usage scenarios. As a non-limiting example, the predetermined condition may be that the maximum usage amount or the average usage amount over a particular time period (e.g., since the last upgrade of virtual system 230 or the most recent specified length of time) of a certain resource (e.g., CPU usage) of virtual system 230 exceeds a threshold, or a threshold time is exceeded. As another example, the predetermined condition may be that the length of time in which the usage amount of a certain resource of virtual system 230 exceeds a usage amount threshold exceeds a threshold length of time. The predetermined condition may also be a combination of conditions regarding two or more resource usage states.

When virtual system 230 needs to be upgraded, device 250 may further utilize upgrade analysis module 440 to determine, based on the attribute sets of the set of candidate cloud services, whether virtual system 230 can be upgraded.

In some embodiments, upgrade analysis module 440 may determine, based on the attribute sets of the set of candidate cloud services, whether there is a candidate cloud service that can be used for upgrading virtual system 230 in that set of candidate cloud services. In response to determining that there is no candidate cloud service that can be used for upgrading virtual system 230, upgrade analysis module 440 may determine that virtual system 230 cannot be upgraded. In response to determining that there is a candidate cloud service that can be used for upgrading virtual system 230, upgrade analysis module 440 may determine that virtual system 230 can be upgraded.

In some such embodiments, as previously described, upgrade analysis module 440 may have determined one or more resource usage states that meet the predetermined condition when determining that virtual system 230 needs to be upgraded. In this case, based on attribute values associated with the one or more resource usage states in an attribute set of a corresponding candidate cloud service in the set of candidate cloud services, upgrade analysis module 440 may determine whether the corresponding candidate cloud service can optimize at least one of the one or more resource usage states, and thereby determine that the corresponding candidate cloud service can be used to upgrade virtual system 230. For example, upgrade analysis module 440 may have determined that the average CPU usage of virtual system 230 exceeds a threshold and may therefore determine, based on the CPU performance parameters supported by the corresponding candidate cloud service, whether the corresponding candidate cloud service can reduce the average usage of CPU.

In response to determining that the virtual system can be upgraded, device 250 may further utilize upgrade analysis module 440 to select a cloud service or a combination of cloud services from the set of candidate cloud services based on the system resource usage data of virtual system 230 and the attribute sets of the candidate cloud services as a recommendation for upgrading virtual system 230. As an example, upgrade analysis module 440 may recommend one or more previously determined candidate cloud services that can be used for upgrading system 230. In another example, upgrade analysis module 440 may also recommend a candidate cloud service (e.g., of a virtual machine instance type with higher performance) or a combination of cloud services (e.g., of a virtual machine instance type and a particular cloud disk edition type) that can result in the most improvement in the resource usage state of virtual system 230 among the one or more candidate cloud services that can be used for upgrading virtual system 230. In such example, based on the usage purpose, scenario, and the like of particular virtual system 230, upgrade analysis module 440 may assign different weights to the one or more resource usage states that need to be improved as determined above, so as to determine the optimal combination of recommendations.

Based on the recommendations of upgrade analysis module 440, device 250 may utilize report generation module 450 to generate a recommendation report that may include an indication of the recommended candidate cloud service. In some embodiments, the recommendation report may also include an indication of a performance bottleneck of virtual system 230, such as one or more resource usage states that need to be improved. In some embodiments, device 250 may also generate a user-friendly natural language report. For example, in the context of virtual system 230 being a DD VE system, an example of that report may be in a format similar to the following format: "Example X.X.X will solve your current CPU shortage problem."

In some embodiments, the generated recommendation report may then be communicated to the user of virtual system 230. For example, device 250 may send a recommendation report to client terminal 240 to display the recommendation report on client terminal 240. In some such embodiments, the user of virtual system 230 may, for example, instruct device 250 via client terminal 240 to perform the upgrade to virtual system 230 based on the recommendation report. In response to receiving an instruction to perform the upgrade based on the recommendation report, device 250 may upgrade a cloud service among the cloud services currently used by virtual system 230 that has the same type as the recommended candidate cloud service to the recommended candidate cloud service. For example, virtual system 230 may be migrated to a virtual machine instance of the recommended edition and/or its storage may be updated to the recommended cloud disk edition.

Architecture 400 may provide a framework and solution that integrate a plurality of functional modules. This solution includes a variety of functions such as cloud service release monitoring, performance verification, system resource analysis, and upgrade information notification that can provide customized upgrade recommendations for virtual systems.

Figure 5:
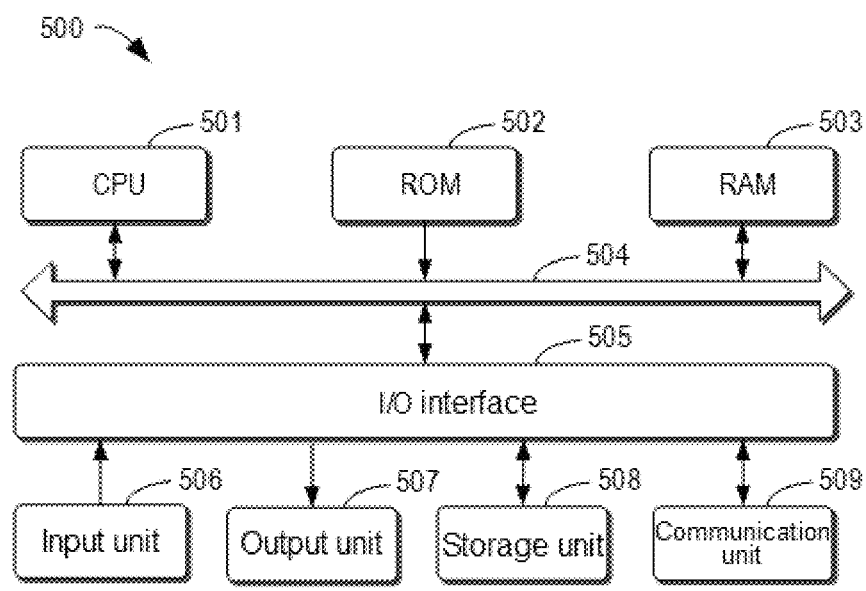
FIG. 5 illustrates a schematic block diagram of a device that may be used to implement embodiments of the present disclosure.

FIG. 5 shows a schematic block diagram of device 500 that may be configured to implement embodiments of the present disclosure. Device 500 may be the device or apparatus described in the embodiments of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504. Although not shown in FIG. 5, device 500 may also include a co-processor.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods or processes described above may be performed by processing unit 501. For example, in some embodiments, the method may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, state setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A method for upgrading a virtual system, comprising:
monitoring, by a processor, usage of system resources by the virtual system to acquire resource usage data indicating a system resource usage state of the virtual system, the usage of system resources including memory usage, and the virtual system using cloud services that provide the system resources;
determining, based on the resource usage data, whether the virtual system needs to be upgraded; and
in response to acquiring attribute sets of a set of candidate cloud services and determining that the virtual system needs to be upgraded, determining, based on the attribute sets, whether the virtual system can be upgraded;
determining a recommended upgrade in response to determining that the virtual system can be upgraded, the recommended upgrade comprising a candidate cloud service from the set of candidate cloud services based on the resource usage data and the attribute sets; and
upgrading a cloud service among the cloud services used by the virtual system based on the recommended upgrade.

2. The method according to claim 1, further comprising:
generating a recommendation report for an upgrade of the virtual system, the recommendation report comprising an indication of the recommended candidate cloud service.

3. The method according to claim 2, further comprising:
upgrading, in response to receiving an instruction to perform the upgrade based on the recommendation report, a cloud service among the cloud services used by the virtual system that has a same type as the recommended candidate cloud service to the recommended candidate cloud service.

4. The method according to claim 1, wherein determining, based on the resource usage data, whether the virtual system needs to be upgraded comprises:
determining, based on the resource usage data, whether one or more resource usage states of the virtual system meet a predetermined condition; and
determining, in response to determining that the one or more resource usage states of the virtual system meet the predetermined condition, that the virtual system needs to be upgraded.

5. The method according to claim 4, wherein determining, based on the attribute sets, whether the virtual system can be upgraded comprises:
determining, based on the attribute sets of the set of candidate cloud services, whether a candidate cloud service that can be used for upgrading the virtual system exists in the set of candidate cloud services;
determining, in response to determining that the candidate cloud service does not exist in the set of candidate cloud services, that the virtual system cannot be upgraded; and
determining, in response to determining that the candidate cloud service exists in the set of candidate cloud services, that the virtual system can be upgraded.

6. The method according to claim 5, wherein determining whether a candidate cloud service that can be used for upgrading the virtual system exists in the set of candidate cloud services comprises:
determining, based on attribute values associated with the resource usage states in an attribute set of a corresponding candidate cloud service in the set of candidate cloud services, whether the corresponding candidate cloud service can optimize at least one of the resource usage states.

7. The method according to claim 1, wherein acquiring the attribute sets of the set of candidate cloud services comprises:
determining, in response to acquiring attribute sets of a set of available cloud services, from the set of available cloud services one or more available cloud services providing system resources that meet a predetermined performance requirement; and determining the one or more available cloud services as the set of candidate cloud services.

8. An electronic device, comprising:

a processor; and a memory coupled to the processor storing instructions therein which, when executed by the processor, cause the processor to perform actions, the actions comprising:

monitoring, by the processor, usage of system resources by a virtual system to acquire resource usage data indicating a system resource usage state of the virtual system, the usage of system resources including memory usage, and the virtual system using cloud services that provide the system resources;

determining, in response to acquiring attribute sets of a set of candidate cloud services and based on the resource usage data, whether the virtual system needs to be upgraded;

determining, in response to determining that the virtual system needs to be upgraded and based on the attribute sets, whether the virtual system can be upgraded;

determining a recommended upgrade in response to determining that the virtual system can be upgraded, the recommended upgrade comprising a candidate cloud service from the set of candidate cloud services based on the resource usage data and the attribute sets; and upgrading a cloud service among the cloud services used by the virtual system based on the recommended upgrade.

9. The device according to claim 8, wherein the actions further comprise:

generating a recommendation report for an upgrade of the virtual system, the recommendation report comprising an indication of the recommended candidate cloud service.

10. The device according to claim 9, wherein the actions further comprise:

upgrading, in response to receiving an instruction to perform the upgrade based on the recommendation report, a cloud service among the cloud services used by the virtual system that has a same type as the recommended candidate cloud service to the recommended candidate cloud service.

11. The device according to claim 8, wherein determining, based on the resource usage data, whether the virtual system needs to be upgraded comprises:

determining, based on the resource usage data, whether one or more resource usage states of the virtual system meet a predetermined condition; and determining, in response to determining that the one or more resource usage states of the virtual system meet the predetermined condition, that the virtual system needs to be upgraded.

12. The device according to claim 11, wherein determining, based on the attribute sets, whether the virtual system can be upgraded comprises:

determining, based on the attribute sets of the set of candidate cloud services, whether a candidate cloud service that can be used for upgrading the virtual system exists in the set of candidate cloud services;

determining, in response to determining that the candidate cloud service does not exist in the set of candidate cloud services, that the virtual system cannot be upgraded; and determining, in response to determining that the candidate cloud service exists in the set of candidate cloud services, that the virtual system can be upgraded.

13. The device according to claim 12, wherein determining whether a candidate cloud service that can be used for upgrading the virtual system exists in the set of candidate cloud services comprises:

determining, based on attribute values associated with the resource usage states in an attribute set of a corresponding candidate cloud service in the set of candidate cloud services, whether the corresponding candidate cloud service can optimize at least one of the resource usage states.

14. The device according to claim 8, wherein acquiring the attribute sets of the set of candidate cloud services comprises:

determining, in response to acquiring attribute sets of a set of available cloud services, from the set of available cloud services one or more available cloud services providing system resources that meet a predetermined performance requirement; and determining the one or more available cloud services as the set of candidate cloud services.

15. A non-transitory computer-readable medium having instructions stored therein, which when executed by a processor, cause the processor to perform actions, the actions comprising:

monitoring, by the processor, usage of system resources by a virtual system to acquire resource usage data indicating a system resource usage state of the virtual system, the usage of system resources including memory usage, and the virtual system using cloud services that provide the system resources;

determining, based on the resource usage data, whether the virtual system needs to be upgraded;

in response to acquiring attribute sets of a set of candidate cloud services and determining that the virtual system needs to be upgraded, determining, based on the attribute sets, whether the virtual system can be upgraded;

determining a recommended upgrade in response to determining that the virtual system can be upgraded, the recommended upgrade comprising a candidate cloud service from the set of candidate cloud services based on the resource usage data and the attribute sets; and upgrading a cloud service among the cloud services used by the virtual system based on the recommended upgrade.

16. The computer-readable medium according to claim 15, wherein the actions further comprise:

generating a recommendation report for an upgrade of the virtual system, the recommendation report comprising an indication of the recommended candidate cloud service.

17. The computer-readable medium according to claim 16, wherein the actions further comprise:

upgrading, in response to receiving an instruction to perform the upgrade based on the recommendation report, a cloud service among the cloud services used by the virtual system that has a same type as the recommended candidate cloud service to the recommended candidate cloud service.

18. The computer-readable medium according to claim 15, wherein determining, based on the resource usage data, whether the virtual system needs to be upgraded comprises:

determining, based on the resource usage data, whether one or more resource usage states of the virtual system meet a predetermined condition; and determining, in response to determining that the one or more resource usage states of the virtual system meet the predetermined condition, that the virtual system needs to be upgraded.

19. The computer-readable medium according to claim 18, wherein determining, based on the attribute sets, whether the virtual system can be upgraded comprises:
   determining, based on the attribute sets of the set of candidate cloud services, whether a candidate cloud service that can be used for upgrading the virtual system exists in the set of candidate cloud services;
   determining, in response to determining that the candidate cloud service does not exist in the set of candidate cloud services, that the virtual system cannot be upgraded; and
   determining, in response to determining that the candidate cloud service exists in the set of candidate cloud services, that the virtual system can be upgraded.

20. The computer-readable medium according to claim 19, wherein determining whether a candidate cloud service that can be used for upgrading the virtual system exists in the set of candidate cloud services comprises:
   determining, based on attribute values associated with the resource usage states in an attribute set of a corresponding candidate cloud service in the set of candidate cloud services, whether the corresponding candidate cloud service can optimize at least one of the resource usage states.

\* \* \* \* \*